Dec. 27, 1966    R. G. SCHIEMAN    3,295,040
CURRENT LIMIT CIRCUIT
Filed Nov. 12, 1963    2 Sheets-Sheet 1

INVENTOR.
ROBERT G. SCHIEMAN
BY Woodling, Krost, Granger and Rust
ATTORNEYS

Dec. 27, 1966  R. G. SCHIEMAN  3,295,040
CURRENT LIMIT CIRCUIT
Filed Nov. 12, 1963  2 Sheets-Sheet 2

INVENTOR.
ROBERT G. SCHIEMAN
BY Woodling, Krost,
Granger, and Rust
ATTORNEYS

United States Patent Office 3,295,040
Patented Dec. 27, 1966

3,295,040
CURRENT LIMIT CIRCUIT
Robert G. Schieman, Cleveland Heights, Ohio, assignor to Reliance Electric and Engineering Company, a corporation of Ohio
Filed Nov. 12, 1963, Ser. No. 322,836
3 Claims. (Cl. 318—326)

This invention relates to an electrical system including a current limiting circuit and to an adjustable magnetic amplifier embodied therein.

One important practical application of the present invention is in a system for selectively limiting the speed and torque of a D.C. motor by limiting the motor armature current. Prior to the present invention, various systems for this purpose have been proposed which include a tachometer feedback arrangement to produce a feedback voltage proportional to the motor speed, and this feedback voltage controls an error signal which controls the motor armature current or voltage. Additionally, a current limit circuit may be added which limits the maximum current. The present invention is directed to such a current limiting circuit which is especially adapted for this purpose, as well as being useful for other applications.

The present invention permits D.C. isolation of a feedback circuit and a current limit circuit so that any high voltages such as 230 or 440 volts customarily used in a power rectifier circuit to supply a D.C. load such as a motor armature are not applied to a tachometer feedback circuit wherein a tachometer may have only low voltage insulation. Further, with this D.C. isolation, no separate or floating power supply is needed for the current limit circuit.

Accordingly, it is an object of this invention to provide in an electrical system a novel and improved current limiting circuit.

It is also an object of this invention to provide a D.C. motor control system embodying such a current limiting circuit.

Another object of this invention is to provide in an electrical system a novel current limiting circuit which is capable of an extremely fast response.

Another object of this invention is to provide in an electrical system a current limiting circuit of improved stability.

Another object of this invention is to provide an electrical system having a novel current limiting circuit which is D.C. isolated from the circuit whose current is being limited.

Another object of this invention is to provide in an electrical system a novel current limiting circuit which is adapted to adjust over a relatively wide range the magnitude of the current at which the limiting action takes place without requiring an adjustable power supply for the limiting circuit.

Another object of this invention is to provide in an electrical system a novel current limiting circuit whose operation is relatively insensitive to variations in its power supply.

Another object of this invention is to provide in an electrical system a novel current limiting circuit which may be adapted readily for an A.C. power supply of any desired number of phases, such as three-phase, single-phase, six-phase or twelve-phase.

Another aspect of this invention is directed to a novel and improved magnetic amplifier whose gain is readily adjustable.

Other objects and a fuller understanding of the invention may be had by referring to the following description and claims, taken in conjunction with the accompanying drawings, in which:

Figure 1:
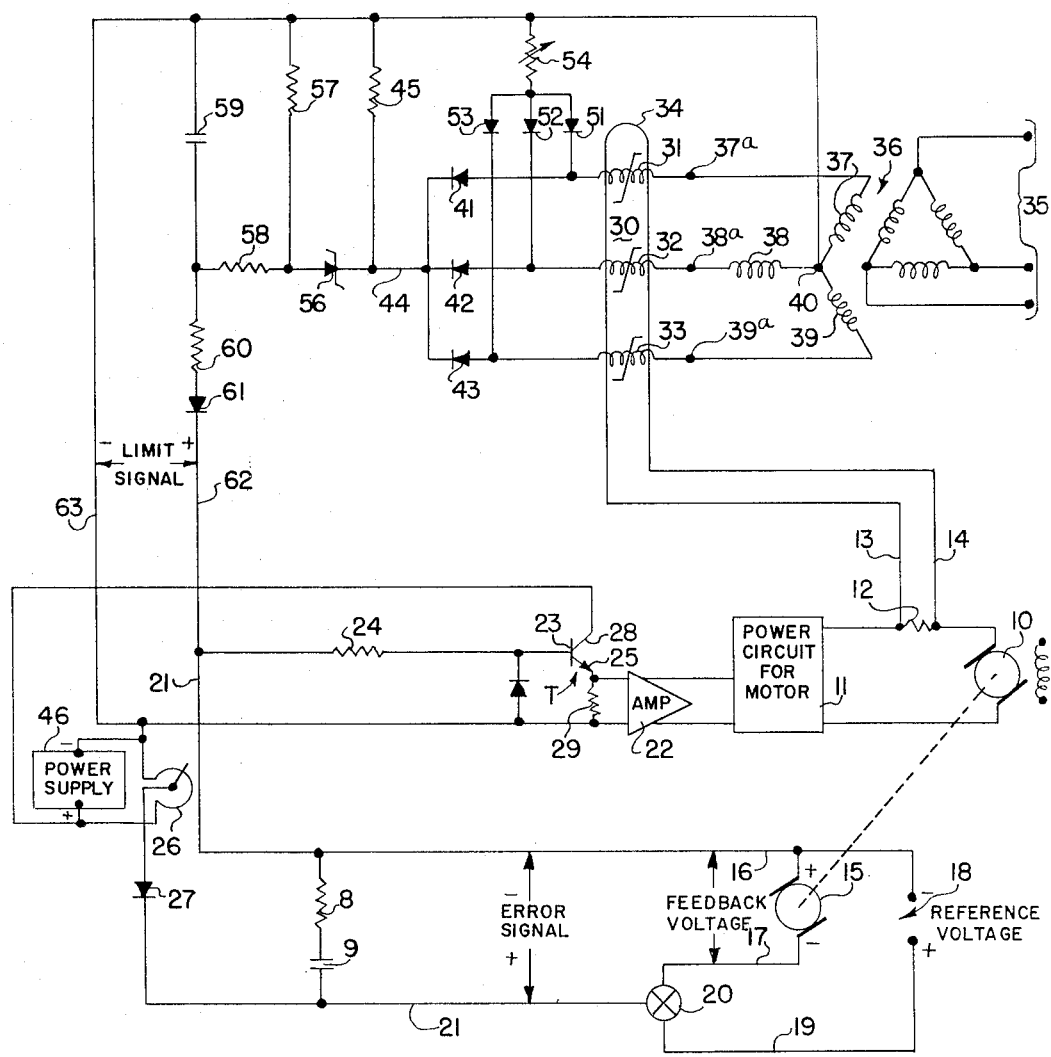
FIGURE 1 is a schematic electrical circuit diagram of a D.C. motor speed control system containing a first embodiment of the present current limiting circuit, which includes a three-phase magnetic amplifier in accordance with the present invention.

Referring first to FIGURE 1, the system shown therein includes a D.C. motor of any suitable design whose armature 10 and field windings are energized by direct current derived from a three-phase power circuit 11 of known design. An armature shunt 12 of known design is connected in the motor armature circuit so as to provide a voltage across lines 13 and 14 which is proportional to the motor armature current.

The motor is provided with a conventional speed control circuit which includes a tachometer feedback arrangement 15 of known design, adapted to produce a feedback voltage across lines 16 and 17 which is proportional to the rotational speed of the motor armature 10. This feedback voltage is compared against a reference voltage 18, appearing across lines 16 and 19, in a voltage comparison device or circuit 20 of known design. The resulting error signal or difference voltage, which appears across lines 16 and 21, is fed back to the power circuit 11 for the motor to control the current to the motor armature 10. A resistor 8 and a capacitor 9 are connected in series with each other across lines 16 and 21 to filter this error signal.

The feedback circuit for the error signal includes an N-P-N transistor T and an amplifier 22 connected in cascade at the input side of the power circuit 11. The base 23 of transistor T is connected through a resistor 24 to line 21. The emitter 25 of transistor T is connected through a load resistor 29, a bias rheostat 26 and a semiconductor rectifier 27 to line 16. The collector 28 of transistor T is connected to the positive terminal of rheostat 26, which is supplied from power supply 46.

The motor armature 10 is illustrative of any form of a D.C. load supplied from the power circuit 11. Under normal steady state conditions, the reference voltage 18 is slightly greater than the tachometer feedback voltage 15. The difference is the error signal on lines 16 and 21, and in this embodiment is positive on line 21. This is opposed by a larger bias voltage from rheostat 26 to apply a positive voltage on the base 23 of transistor T. At zero speed, this bias voltage causes sufficient condition through transistor T, as determined by the bias or zero setting of rheostat 26, to cause a maximum signal through amplifier 22 to the power circuit 11. This power circuit may be of any usual type which upon a maximum input signal produces a zero output to the motor armature 10. Under the aforesaid steady state conditions, enough feedback signal is applied to the transistor T to cause it to conduct sufficiently so that the power circuit 11 supplies the requisite power to the motor armature 10 to maintain the steady state conditions. The power circuit 11 may be a magnetic amplifier control circuit for example, and the signal from the amplifier 22 may control the reset of such magnetic amplifier. Accordingly, if the reset is increased, the output from the power circuit 11 will be decreased.

Should the motor 10 be subjected to an increased load this would momentarily reduce the feedback voltage of tachometer 15, thus increasing the error signal on lines 16 and 21. This would reduce the bias on and conduction of transistor T and reduce the output of amplifier 22 to increase the output of the power circuit 11 to attempt to re-establish the pre-set speed.

The setting of rheostat 26 establishes the bias or zero set condition to cause sufficient conduction through transistor T to eliminate any power output from the power circuit 11 for complete de-energization of the motor armature 10.

In accordance with the present invention, a novel magnetic amplifier 30 is connected to control the armature current, also. In the particular arrangement shown in FIGURE 1, a three-phase magnetic amplifier 30 is shown. It includes three saturable cores having individual load windings 31, 32 and 33, each in inductive relationship to its core, and a control winding 34 in inductive relationship with each of the cores. The control winding 34 is connected across lines 13 and 14, so that the D.C. signal appearing across the control winding 34 is proportional to the instantaneous motor armature current. The physical arrangement of the cores and windings in the magnetic amplifier 30 may be of any suitable design, the details of which are not part of the present invention.

The magnetic amplifier 30 is energized from a three-phase A.C. power supply 35 through a delta-Y transformer 36. Power supply 35 may also energize the power circuit 11 by connections, not shown. One output winding 37 of this transformer has one of its terminals 37a connected directly to one terminal of the first load winding 31 in the magnetic amplifier 30. The second output winding 38 of this transformer has one of its terminals 38a connected directly to one terminal of the second load winding 32. The third output winding 39 of this transformer has one of its terminals 39a connected directly to one terminal of the third load winding 33. The opposite terminals of the transformer output windings 37, 38 and 39 are connected to a neutral center point 40. The voltage across each winding 37, 38, 39 is 15 volts, in one practical embodiment.

The opposite terminals of the respective load windings 31, 32 and 33 in the magnetic amplifier 30 are connected through a first set of semiconductor rectifiers 41, 42 and 43, respectively, to an output line 44. A resistor 45 is connected between line 44 and the neutral point 40 of the transformer. The anode of each rectifier 41, 42 or 43 in the first set is connected directly to the respective load winding 31, 32 or 33, and the cathode of each of these rectifiers is connected directly to line 44. Therefore, each of these rectifiers conducts current only during the "positive" half cycle of the voltage across the respective load winding. The control winding 34 may be only a single turn winding, as illustrated, or may be a plural turn winding as needed. Also, it may be a single winding or individual windings for the separate load windings 31, 32 and 33. The polarity of this control winding 34 as connected to the shunt 12 is such that the flux established in the respective core from the control winding 34 is in the same direction as the flux established in the respective core during the "positive" half cycle of current conducted by the first set of rectifiers 41, 42 and 43. Each rectifier 41, 42 or 43 blocks current during the "negative" half cycle of the voltage across the respective load winding 31, 32 or 33. The "negative" half-cycle is the half-cycle when the flux induced in the respective core by the A.C. power supply is in the opposite direction (subtracts) from the flux induced in that core by the D.C. control signal on control winding 34.

In accordance with the present invention an additional set of semiconductor rectifiers 51, 52 and 53 are connected respectively to the load windings 31, 32 and 33 of the magnetic amplifier. The cathode of each of these rectifiers is connected directly to the respective load winding 31, 32 or 33 of the magnetic amplifier. The anodes of these rectifiers are all connected through an adjustable resistor or rheostat 54 to the neutral point 40.

In the operation of this amplifier, during each "positive" half cycle of the power supply, the respective load winding 31, 32 or 33 passes current of positive polarity through the respective rectifier 41, 42 or 43 to produce a voltage across resistor 45. The core will saturate at some time during each positive half cycle, depending upon the magnitude of the control (input) signal on winding 34.

During each "negative" half cycle of the power supply, the respective rectifier 41, 42 or 43 acts to prevent current through the respective load winding 31, 32 or 33. At the same time, however, the respective rectifier 51, 52 or 53 permits such negative current through the respective load winding 31, 32 or 33, the magnitude of this negative current being determined by the resistance of resistor 54.

Accordingly, the magnetic amplifier 30 may be regarded as operating as a self-saturating magnetic amplifier during the positive half cycles of the supply voltage and as a saturable core reactor during the negative half cycles.

The conjoint action of the opposite polarity rectifiers during each negative half cycle is to shift the B–H magnetization curve of that leg of the magnetic amplifier 30 and thereby to vary the amplifier gain in proportion to the resistance setting of variable resistor 54.

If rheostat 54 presented a substantially infinite resistance, then the magnetic amplifier 30 would operate as a so-called "internal feedback amplifier" conducting current only during the positive half cycles of the supply voltage and having a maximum shift of the B–H curve (and thus a maximum gain) due to the blocking of current during the negative half cycles. Conversely, for a minimum resistance setting of resistor 54, the rectifiers 51, 52, 53 would permit the negative current amplitude during the negative half cycles to be almost as great as the current amplitude through rectifiers 41, 42, 43 in the positive half cycles. Consequently, there would be a minimum shift of the B–H curve, and thus a minimum "internal feedback," as a result of the high current during negative half cycles, so that the gain would be reduced correspondingly.

The overall function of the magnetic amplifier 30 is to amplify the D.C. control signal which appears across control winding 34. That is, the magnitude of the amplifier output signal will vary with the magnitude of the D.C. control signal across winding 34, which is proportional to the motor armature current. Also, since the gain varies with the setting of rheostat 54, the amplifier output signal will also be determined by this setting.

In practice this gain can be varied over a wide range, simply by adjusting resistor 54 and without requiring a variable power supply for the amplifier 30, and with a very large output range of the magnetic amplifier.

A Zener diode 56 is connected to line 44 to block the output signal from the magnetic amplifier until this signal exceeds a predetermined level. As long as this Zener diode is non-conductive, resistor 45 provides the load for the magnetic amplifier.

When the output signal from the magnetic amplifier exceeds the Zener voltage and diode 56 conducts, this output signal appears across a resistor 57, which is connected between the Zener diode and the neutral point 40 of the transformer 36. A resistor 58 and a capacitor 59, connected in series with each other across resistor 57, filter this output signal.

A resistor 60 and a semiconductor rectifier 61 are connected in series with each other between the juncture of resistor 58 and capacitor 59 and an output line 62.

The limit signal produced by the magnetic amplifier appears between line 62 and a line 63, connecting the neutral point 40 of the transformer to the emitter electrode 25 of transistor T through resistor 29. This limit signal, therefore, is applied across the base and emitter of transistor T in additive relationship to the error signal produced in the tachometer feedback circuit.

In the operation of this system, depending upon the setting of rheostat 54, when the motor armature current exceeds a predetermined magnitude, the corresponding D.C. control signal on winding 34 will cause the magnetic amplifier to produce an output signal exceeding the breakdown voltage of the Zener diode 56. After being filtered, this output signal appears as a limit signal across lines 62 and 63. This limit signal adds to the error signal produced by the tachometer feedback arrangement and, after amplification, causes the power circuit 11 to reduce the motor armature current.

Rectifier 61 prevents the error signal from appearing in the limit signal feedback circuit. Likewise, rectifier 27 prevents the limit signal from appearing in the error signal feedback circuit. Therefore, the limit and error signal feedback circuits are D.C. isolated from each other.

The response of the magnetic amplifier is extremely fast, enabling the motor armature current to be limited within a fraction of a cycle of the power supply for the motor, so that the motor speed and torque is effectively limited with great precision and speed. Also, the limit signal circuit is highly stable, being relatively insensitive to variations in the A.C. power supply 35.

Figure 2:
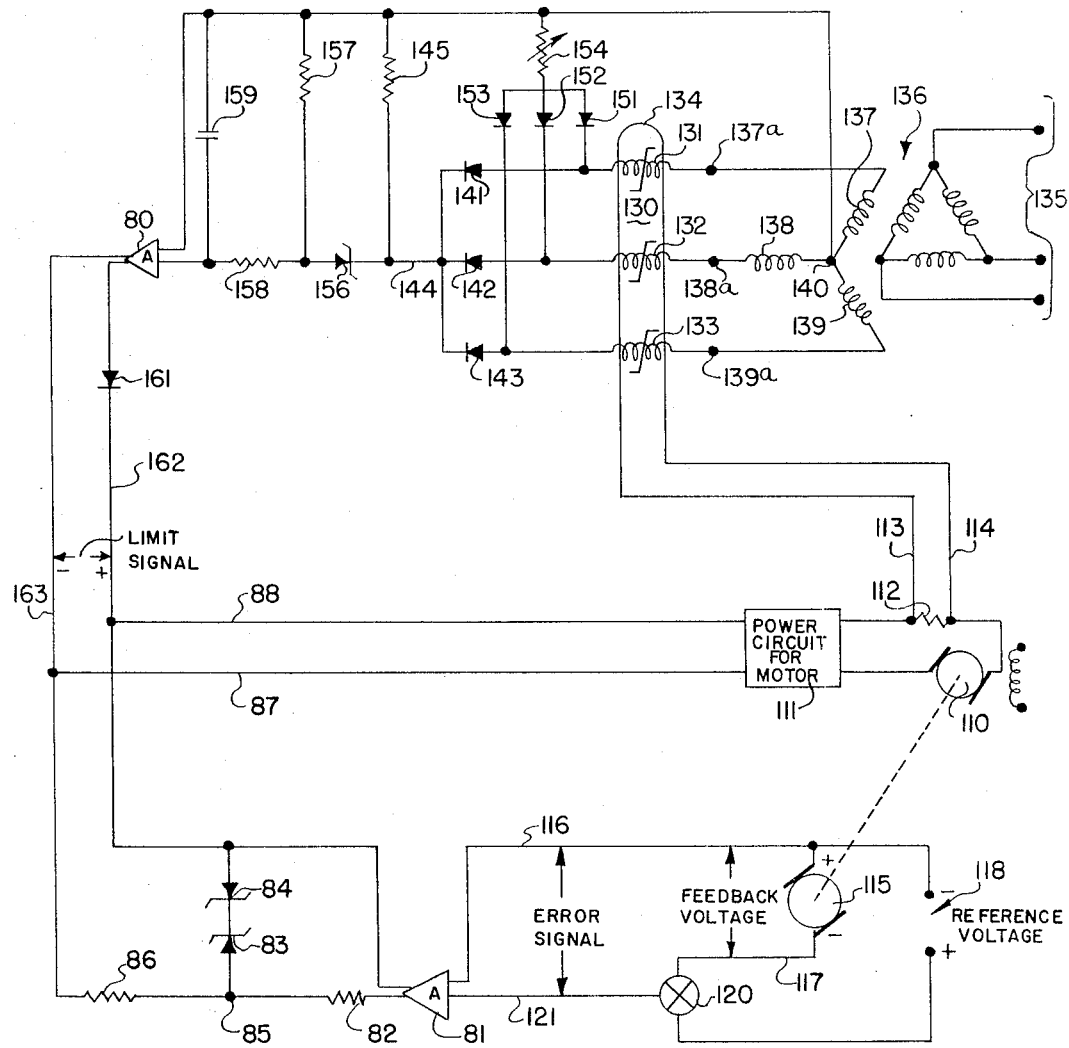
FIGURE 2 is a similar view of a D.C. motor speed control system containing a second embodiment of the present current limiting circuit, which includes the same three-phase magnetic amplifier; and, FIGURE 3 is a schematic electrical circuit diagram of a single-phase magnetic amplifier in accordance with the present invention.

FIGURE 2 shows an alternating D.C. motor speed control system embodying the present current limiting circuit and the adjustable magnetic amplifier therein. Elements of the FIGURE 2 circuit which correspond to those in the FIGURE 1 circuit are given the same reference numerals plus 100. The arrangement and functions of these correspondingly numbered elements is the same as in FIGURE 1. Therefore, a detailed description of them is unnecessary.

The feedback circuit for the limit signal from the magnetic amplifier in FIGURE 2 differs from the corresponding feedback circuit in FIGURE 1 in that it includes an amplifier 80 connected between the filter 158, 159 and the rectifier 161.

The error signal feedback circuit in FIGURE 2 also includes an amplifier 81 for amplifying the error signal. A resistor 82 and two Zener diodes 83 and 84, which are connected cathode-to-cathode, are connected in series with each other across the output of amplifier 81. The function of resistor 82 and Zener diodes 83, 84 is to limit the range of error amplifier 81.

A load resistor 86 for the limit signal is connected between line 163 and the juncture 85 between resistor 82 and Zener diode 83. A line 87 connects line 163 and resistor 86 to one input terminal of the power circuit 111 for the motor. Another line 88 connects line 162 and the anode of Zener diode 84 to the other input terminal of this power circuit.

In the operation of this system, in the absence of a limit signal across lines 162 and 163, the error signal produced by the tachometer feedback arrangement is amplified and fed back via lines 87 and 88 to the power circuit 111 for the motor so as to control the power input to the motor.

This error signal appears across the series-connected Zener diodes 84, 83 and resistor 82. Depending upon the polarity of the error signal, one of the Zener diodes 83, 84 will clamp the amplified error signal and prevent it from exceeding a predetermined magnitude. When a limit signal is produced across lines 162 and 163, as described in connection with FIGURE 1, this limit signal is applied via lines 87 and 88 to the power circuit 111 for the motor, so as to limit the motor armature current, as described. The amplifiers 80 and 81 provide the circuit of FIGURE 2 with higher gain than the circuit of FIGURE 1.

Figure 3:
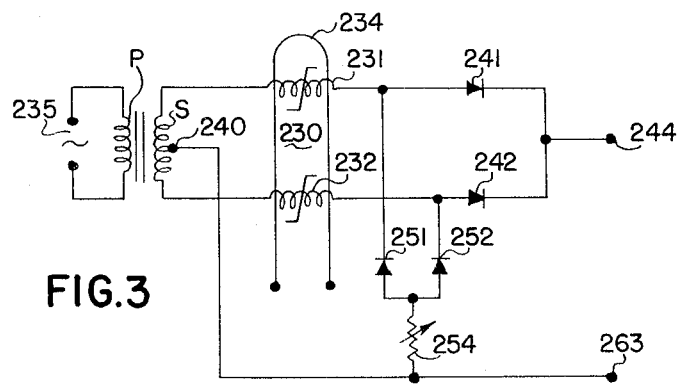

FIGURE 3 illustrates a single-phase magnetic amplifier in accordance with the present invention. This amplifier may be embodied in a single-phase motor control system in a manner which will be readily apparent from the foregoing description of three-phase motor control systems, or it may be used for various other purposes.

Referring to FIGURE 3, the magnetic amplifier 230 comprises a pair of saturable magnetic cores having individual load windings 231 and 232 thereon and a control winding 234 in inductive relationship to both cores.

A single-phase A.C. power source 235 is connected across the primary winding P of a transformer. The secondary winding S of this transformer has its opposite ends connected directly, respectively, to corresponding terminals of the load windings 231 and 232.

The respective opposite terminals of these load windings are connected through a first set of semiconductor rectifiers 241 and 242 to an output terminal 244 of the amplifier. The anodes of these rectifiers are connected directly to the respective load windings 231, 232 while the cathodes are connected directly to each other and to terminal 244.

An additional set of semiconductor rectifiers 251 and 252 are connected to the load windings, also. The cathode of rectifier 251 is connected directly to the anode of rectifier 241 and to the corresponding terminal of load winding 231. The cathode of rectifier 252 is connected directly to the anode of rectifier 242 and to the corresponding terminal of load winding 232. The anodes of rectifiers 251 and 252 are connected directly to each other and to one terminal of an adjustable resistor or rheostat 254. The opposite terminal of this resistor is connected directly to the other output terminal 263 of this amplifier 230, and to a center tap 240 on the transformer secondary winding S.

The operation of this single-phase amplifier is believed to be readily apparent from the previous detailed description of the three-phase amplifier, and therefore this description will not be repeated.

Although this invention has been described in its preferred form with a certain degree of particularity, it is understood that the present disclosure of the preferred form has been made only by way of examples and that numerous changes in the details of the circuit and the combination and arrangement of circuit elements may be resorted to without departing from the spirit and scope of the invention as hereinafter claimed.

What is claimed is:

1. A system for limiting the current of a D.C. motor comprising:
   power circuit means for controlling the armature current for the motor;
   a three-phase magnetic amplifier comprising three saturable magnetic cores, three load windings in inductive relationship respectively to said cores, and a control winding in inductive relationship to said cores;
   an armature shunt connected to the armature of the motor;
   means connecting said control winding to said armature shunt to apply to said control winding a D.C. control signal proportional in magnitude to the current to the motor armature and which induces magnetic flux in one direction in said core;
   an A.C. power supply including a three-phase transformer having a neutral point;
   means for connecting each phase of the transformer to one side of a corresponding load winding for energizing the latter to induce flux in the corresponding core which is in said one direction in one-half cycle of the A.C. power supply and which is in the opposite direction in the opposite half-cycle of the A.C. power supply;
   a first set of three rectifiers, each having its terminal of one polarity connected to the opposite side of a respective load winding and each having its opposite polarity terminal connected directly to the opposite polarity terminal of each other rectifier in said set, each said rectifier being operative to pass substantial current only of a polarity corresponding to said one direction of flux in the respective core;

a second set of rectifiers, each having its terminal of said opposite polarity connected to said opposite side of a respective load winding and each having its terminal of said one polarity connected directly to said one polarity terminal of each other rectifier in said second set, each of said rectifiers in the second set being operative to pass substantial current only of a polarity corresponding to said opposite direction of flux in the respective core;

variable resistance means connected between said one polarity terminals of the rectifiers in the second set and said neutral point of the transformer to selectively reduce the magnitude of said last-mentioned current;

blocking means connected to said opposite polarity terminals of the rectifiers in the first set and operative pass current therefrom only when said current exceeds a predetermined magnitude;

and a feedback circuit connected between said motor armature and said power circuit means and operative, in response to output current from the magnetic amplifier passed by said blocking means, to limit the motor armature current produced by said power circuit means.

2. The system of claim 1, wherein said blocking means comprises Zener diode means.

3. The system of claim 1, wherein said feedback circuit includes the rectifier means blocking reverse current flow.

References Cited by the Examiner
UNITED STATES PATENTS

| | | | |
|---|---|---|---|
| 1,807,280 | 5/1931 | Carpenter | 318—326 |
| 2,708,731 | 5/1955 | Morel et al. | 318—326 |
| 2,754,463 | 7/1956 | Hansen et al. | 318—513 X |
| 2,783,427 | 2/1957 | Bracutt | 318—513 X |
| 2,797,375 | 6/1957 | Alexanderson | 318—513 X |
| 2,843,818 | 7/1958 | Mintz et al. | 323—87 X |
| 2,855,554 | 10/1958 | Conger et al. | 318—513 X |
| 3,138,753 | 6/1964 | Covert | 323—89 |
| 3,157,836 | 11/1964 | Jarvinen | 323—89 |

ORIS L. RADER, *Primary Examiner.*

G. SIMMONS, *Assistant Examiner.*